United States Patent
Kim et al.

(10) Patent No.: US 9,232,513 B2
(45) Date of Patent: Jan. 5, 2016

(54) METHOD AND APPARATUS FOR SIGNALING POWER INFORMATION IN WIRELESS COMMUNICATION SYSTEM

(71) Applicant: Samsung Electronics Co. Ltd., Suwon-si, Gyeonggi-do (TW)

(72) Inventors: Tae-Yoon Kim, Seongnam-si (KR); Min-Goo Kim, Hwaseong-si (KR); Jong-Han Lim, Seoul (KR); Chae-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 13/746,663

(22) Filed: Jan. 22, 2013

(65) Prior Publication Data

US 2014/0086160 A1    Mar. 27, 2014

(30) Foreign Application Priority Data

Sep. 21, 2012  (KR) .................... 10-2012-0104950

(51) Int. Cl.
| | |
|---|---|
| *H04W 72/04* | (2009.01) |
| *H04L 1/00* | (2006.01) |
| *H04W 48/00* | (2009.01) |
| *H04W 52/00* | (2009.01) |
| *H04W 52/34* | (2009.01) |

(Continued)

(52) U.S. Cl.
CPC ............ *H04W 72/042* (2013.01); *H04L 1/00* (2013.01); *H04W 48/00* (2013.01); *H04W 52/00* (2013.01); *H04W 52/346* (2013.01); *H04W 52/146* (2013.01); *H04W 52/16* (2013.01); *H04W 52/325* (2013.01); *H04W 52/54* (2013.01); *H04W 72/12* (2013.01); *H04W 92/18* (2013.01)

(58) Field of Classification Search
CPC ... H04W 72/042; H04W 72/12; H04W 48/00; H04W 52/00; H04W 92/18; H04L 1/00
USPC .......................... 370/329, 328, 311; 455/522
See application file for complete search history.

(56) References Cited

U.S. PATENT DOCUMENTS

| | | | |
|---|---|---|---|
| 8,085,819 B2 * | 12/2011 | Kiran et al. ................. | 370/527 |
| 2008/0316950 A1 | 12/2008 | Damnjanovic | |

(Continued)

FOREIGN PATENT DOCUMENTS

EP    1 816 756 A1    8/2007

OTHER PUBLICATIONS

Joerg Schaepperle, Throughput of a Wireless Cell Using Superposition Based Multiple-Access with Optimized Scheduling, 2010 IEEE 21st International Symposium on Personal Indoor and Mobile Radio Communications, Sep. 26-30, 2010, pp. 212-217.

*Primary Examiner* — Brian D Nguyen
(74) *Attorney, Agent, or Firm* — Jefferson IP Law, LLP

(57) ABSTRACT

A method and apparatus for signaling power information in a wireless communication system are provided. A base station apparatus co-schedules a plurality of User Equipments (UEs) to at least one resource element, and transmits power information indicating transmit power values, which are allocated for the co-scheduled UEs, to the co-scheduled UEs. The power information includes first power information including information about a pilot signal power value and a transmit power value for a first UE among the co-scheduled UEs, and second power information indicating a transmit power value for each of at least one second UE except for the first UE among the co-scheduled UEs.

24 Claims, 6 Drawing Sheets

(51) Int. Cl.
*H04W 72/12* (2009.01)
*H04W 92/18* (2009.01)
*H04W 52/14* (2009.01)
*H04W 52/16* (2009.01)
*H04W 52/32* (2009.01)
*H04W 52/54* (2009.01)

(56) References Cited

U.S. PATENT DOCUMENTS

| | | |
|---|---|---|
| 2010/0254471 A1 | 10/2010 | Ko et al. |
| 2010/0278034 A9 * | 11/2010 | Laroia et al. ............. 370/209 |
| 2011/0019625 A1 | 1/2011 | Zhang et al. |
| 2011/0188481 A1 | 8/2011 | Damnjanovic et al. |
| 2011/0211561 A1 * | 9/2011 | Kiran et al. ............. 370/335 |
| 2011/0312277 A1 * | 12/2011 | Gupta ............. 455/63.1 |
| 2012/0014268 A1 * | 1/2012 | Damnjanovic et al. ....... 370/252 |
| 2012/0155339 A1 | 6/2012 | Anderson |
| 2012/0224533 A1 * | 9/2012 | Lin et al. ............. 370/328 |
| 2012/0269053 A1 * | 10/2012 | Yu et al. ............. 370/216 |
| 2012/0300727 A1 * | 11/2012 | Kim et al. ............. 370/329 |
| 2013/0114523 A1 * | 5/2013 | Chatterjee et al. ............. 370/329 |
| 2013/0170366 A1 * | 7/2013 | Prasad et al. ............. 370/252 |
| 2013/0229941 A1 * | 9/2013 | Huang et al. ............. 370/252 |
| 2013/0261824 A1 * | 10/2013 | Hazra et al. ............. 700/291 |
| 2013/0301756 A1 * | 11/2013 | Badic et al. ............. 375/340 |

* cited by examiner

| Group Index | Power ratio |
|---|---|
| 0 | 0 <= x <= -3dB |
| 1 | -3dB < x <= -6dB |
| 2 | -6dB < x <= -9dB |
| 3 | -9dB < x <=-12dB |

If UE1's power ratio = 0dB("00")and UE2's power ratio = -9dB("10"),
then "00" and "10" bits need to be transmitted.

FIG.7

METHOD AND APPARATUS FOR SIGNALING POWER INFORMATION IN WIRELESS COMMUNICATION SYSTEM

PRIORITY

This application claims the benefit under 35 U.S.C. §119(a) of a Korean patent application filed on Sep. 21, 2012 in the Korean Intellectual Property Office and assigned Serial No. 10-2012-0104950, the entire disclosure of which is hereby incorporated by reference.

BACKGROUND OF THE INVENTION

1. Field of the Invention

The present invention relates to transmission and reception of information in a wireless communication system. More particularly, the present invention relates to a method and apparatus for transmitting and receiving transmit power information in a superposition multiple access system.

2. Description of the Related Art

In a system based on Orthogonal Frequency Division Multiple Access (OFDMA) such as 3rd Generation Partnership Project Long-Term Evolution (3GPP LTE), a User Equipment (UE) requires channel information to demodulate its received data. Therefore, a base station transmits a known signal (e.g., a reference signal and a pilot signal) to the UE using a resource element (e.g., a frequency element) adjacent to a data signal so that the UE may perform channel estimation. Importantly, the UE needs to know a relationship between power (i.e., pilot power) of the pilot signal transmitted for channel estimation and power (i.e., data power) of the data signal, in order to correctly perform data detection.

As compared to that of the OFDMA system, a superposition multiple access system has been developed to increase cell capacity. Within one cell in such a system, a base station simultaneously transmits a signal to two or more UEs using the same frequency resource and each UE detects its desired signal from the received signal. To make it easier for a UE to detect its signal, a modulation scheme may be changed. In such a case however, the modulation order may increase such that backward compatibility with a legacy UE may not be guaranteed. In an alternative technology for ensuring easier signal detection by a UE, a base station may transmit a signal to UEs having different pathlosses with different powers. In that case, each UE may remove signals (i.e., interference) from other UEs, which are received with higher power, before it detects its desired signal. In this situation, the UE needs to have an advanced receiver capable of handling interference, in order to obtain performance gain over the legacy system. In other words, by simultaneously handling its desired signal and interference signals using the advanced receiver, the UE may eliminate the influence of the interference and demodulate the overlapping desired signal.

In order to remove the signals from other UEs or perform joint detection with other UEs, the UE needs to obtain power information of the other UEs. However, the conventional communication systems do not offer any means for transferring power information of other UEs.

Furthermore, in the case of joint detection, a desired signal and an interference signal are received at one UE, experiencing the same channel, so the two different signals may have the same estimated channel. In this case, the UE may not exactly distinguish between the two different signals, causing deterioration of the performance of the joint detection.

Therefore, a need exists for an apparatus and method for improving reception performance of a UE in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting and receiving information in a communication system.

Another aspect of the present invention is to provide a method and apparatus for improving reception performance of a User Equipment (UE) in a wireless communication system.

Another aspect of the present invention is to provide a method and apparatus for signaling by a base station the information needed to perform joint detection in a superposition multiple access system.

Another aspect of the present invention is to provide a method and apparatus for transmitting and receiving power information for a plurality of co-scheduled UEs.

In accordance with an aspect of the present invention, a method for signaling power information in a wireless communication system is provided. The method includes co-scheduling a plurality of UEs to at least one resource element, generating power information indicating transmit power values which are allocated for the co-scheduled UEs, and transmitting the generated power information to at least one of the co-scheduled UEs.

In accordance with another aspect of the present invention, a method for receiving power information in a wireless communication system is provided. The method includes receiving power information indicating transmit power values allocated for a plurality of UEs which are co-scheduled to at least one resource element, receiving a wireless signal including data signals for the co-scheduled UEs, using the at least one resource element, and detecting a desired data signal from the wireless signal based on the power information.

In accordance with still another aspect of the present invention, a base station apparatus for signaling power information in a wireless communication system is provided. The base station apparatus includes a controller for co-scheduling a plurality of UEs to at least one resource element, and a transmitter for transmitting power information indicating transmit power values allocated for the co-scheduled UEs, to at least one of the co-scheduled UEs.

In accordance with yet another aspect of the present invention, a UE apparatus for receiving power information in a wireless communication system is provided. The UE apparatus includes a first receiver for receiving power information indicating transmit power values allocated for a plurality of UEs which are co-scheduled to at least one resource element, a second receiver for receiving a wireless signal including data signals for the co-scheduled UEs, using the at least one resource element, and a data detector for detecting a data signal for the first UE among the plurality of co-scheduled UEs, from the wireless signal based on the power information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 7 is a graph showing group indexes indicating quantized levels of power ratio for co-scheduled UEs according to an exemplary embodiment of the present invention;

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
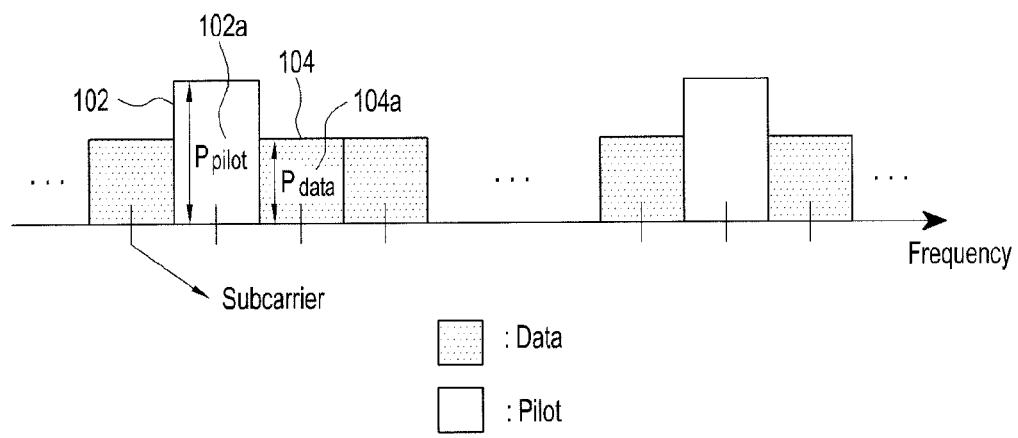
FIG. 1 shows transmission of data and a pilot signal in an Orthogonal Frequency Division Multiple Access (OFDMA) communication system according to an exemplary embodiment of the present invention.

FIG. 1 shows transmission of data and a pilot signal in an Orthogonal Frequency Division Multiple Access (OFDMA) communication system according to an exemplary embodiment of the present invention.

Referring to FIG. 1, a pilot signal 102 is transmitted via or on a subcarrier being adjacent to a data signal 104, and has transmit power $P_{pilot}$ 102a which is higher than transmit power $P_{data}$ 104a of the data signal 104. For demodulation of the data signal 104, a User Equipment (UE) needs to obtain transmit power information of the two signals 102 and 104 in order to use the channel estimated based on the pilot signal 102. Therefore, a base station transfers information about the transmit powers 102a and 104a to the UE. The information may indicate a direct (or actual) value of each of the pilot power 102a and the data power 104a, or may indicate a ratio between the two different values.

For example, the base station transmits, to the UE, power ratio information between a Resource Element (RE) where a pilot signal for channel estimation is transmitted to the UE, and an RE (i.e., data element) where data is transmitted to the UE. The RE may be, for example, a frequency element or a subcarrier. The power ratio information may indicate a ratio between power of a data transmission RE corresponding to the resource allocated to each UE, and power of the RE where the pilot signal is transmitted.

In Long Term Evolution (LTE), a ratio between Cell-specific Reference Signal (CRS) energy and Physical Data Shared Channel (PDSCH) energy of an Orthogonal Frequency Division Multiplexing (OFDM) symbol with no CRS is defined as $\rho_A$, and a ratio between PDSCH energy of an OFDM symbol with a CRS and CRS energy is defined as $\rho_B$. A base station transfers the ratios of two different values to UEs in its cell in a cell-specific manner, and transfers a parameter needed to determine a value of $\rho_A$ to each UE in a user-specific manner. A UE may obtain power information of a CRS and a data signal based on this information, and perform data demodulation based on the power information. The user-specific parameter is transferred only to the UE that receives its associated data signal.

Figure 2:
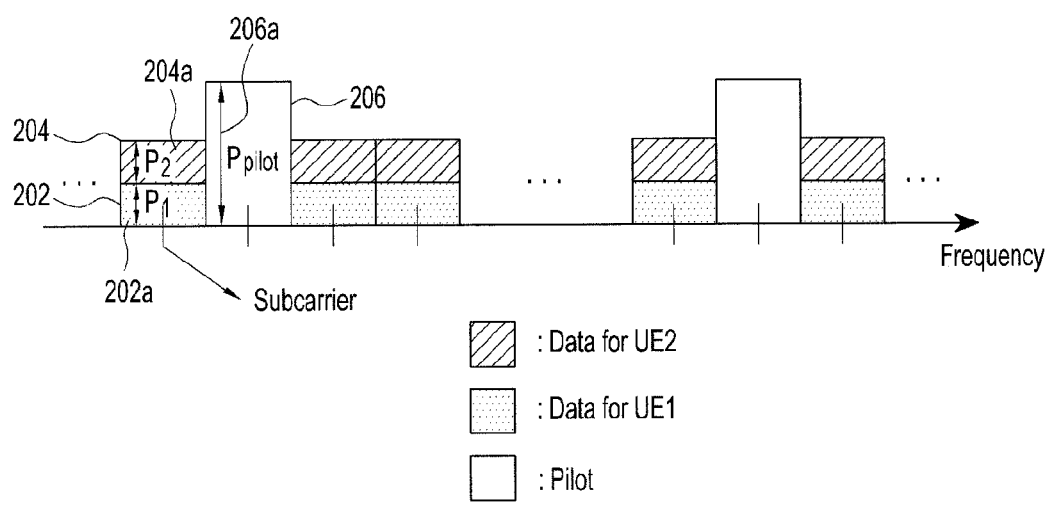
FIG. 2 shows transmission of data and a pilot signal in a superposition multiple access system according to an exemplary embodiment of the present invention.

FIG. 2 shows transmission of data and a pilot signal in a superposition multiple access system according to an exemplary embodiment of the present invention.

Referring to FIG. 2, on subcarriers to which data is allocated, first and second data signals 202 and 204 for a plurality of UEs (e.g., UE1 and UE2) are transmitted together. A pilot signal 206 is allocated to subcarriers in its position, and is generally transmitted with transmit power $P_{pilot}$ 206a which is higher than the total transmit power, $P_1$ 202a+$P_2$ 204a, of the first and second data signals 202 and 204. Each UE detects its data signal (i.e., its desired signal) by removing other UEs' signals from the received signal. The other UEs are considered interference UEs, and the other UEs' signals are considered interference signals. In order to increase performance of the superposition, a base station may schedule UEs satisfying predetermined conditions to the same RE (e.g., one subcarrier). This is called 'co-schedule'. For example, UEs, a difference between pathlosses of which is relatively large, may be selected as co-scheduled UEs.

Figure 3:
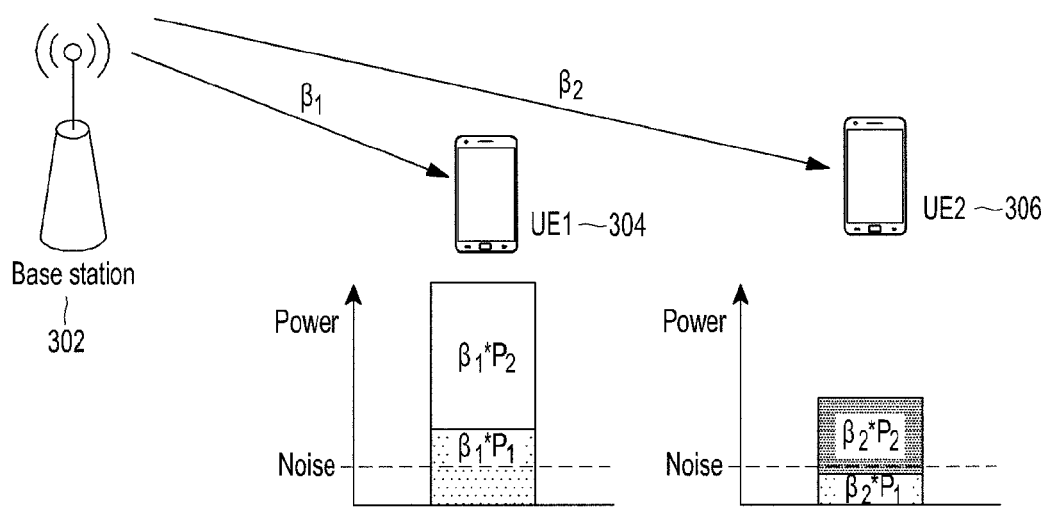
FIG. 3 shows signal transmission to co-scheduled User Equipments (UEs) in a superposition multiple access system according to an exemplary embodiment of the present invention.

FIG. 3 shows signal transmission to co-scheduled UEs in a superposition multiple access system according to an exemplary embodiment of the present invention.

Referring to FIG. 3, two UEs of a UE1 304 and a UE2 306 are co-scheduled, and the pathlosses that the UEs 304 and 306 experience are $\beta_1$ and $\beta_2$, respectively (where $0<\beta_i\leq1$). If $\beta_1<<\beta_2$ (i.e., if the pathloss that the second UE or UE2 306 experiences is greater than the pathloss that the first UE or UE1 304 experiences), it means that the UE2 306 is far away from the cell site or base station 302, compared to the UE1 304, or that the UE2 306 is located in a very poor channel environment (e.g., shaded area), compared to the UE1 304. Therefore, the base station 302 allocates transmit power $P_2$, which is higher than transmit power $P_1$ for the UE1 304, to a data signal for the UE2 306.

A data signal for the UE2 306, which has a higher transmit power, may act as interference to a data signal that the UE1 304 receives. The base station 302 allocates transmit power $P_2$ for the UE2 306 that is much higher than $P_1$, allowing the UE1 304 to easily detect and remove (or superpose) a data signal for the UE2 306. Therefore, the UE1 304 may remove the data signal for the UE2 306 from the received signal, thereby detecting its data signal, and demodulate the detected data signal. Although the data signal for the UE1 304 may act as interference to the received signal for the UE2 306, the data signal for the UE1 304 is received at the UE2 306 with a lower transmit power (e.g., which is lower than or equal to a predetermined noise level), so the UE2 306 may ignore or superpose the data signal for the UE1 304.

In this way, in the superposition multiple access system, data signals for a plurality of UEs are allocated to a single RE and transmitted via the RE, so each UE needs to correctly separate and detect its data signal from data signals (i.e., interference signals) for other UEs, using an interference cancellation or joint detection algorithm. To this end, each UE needs to obtain power information for the other co-scheduled UEs.

If a UE has no power information for the other UEs, which is transmitted in the same RE, the UE may not correctly remove the interference signals, causing a reduction in its detection performance. In other words, if a UE applies the same channel estimation value obtained for the RE to both the desired signal and the interference signals when performing interference cancellation or joint detection, the UE may not detect its desired signal.

Therefore, in the superposition multiple access system in which co-scheduled UEs may dynamically vary, there is a need for technology to better detect a desired signal.

In the superposition multiple access system, a receiver in a UE has a receive algorithm such as interference cancellation and/or joint detection. For operation of the receive algorithm, a base station provides the UE with power information for all of a pilot signal, a UE's desired signal (i.e., a data signal allocated to the UE), and interference signals (i.e., data signals for other UEs co-scheduled to the same RE). By performing interference cancellation or joint detection based on the power information, the UE may improve detection performance for the desired data signal, thus contributing to an increase in scheduling flexibility and system throughput of the superposition multiple access system.

Based on the power information for the pilot signal and the co-scheduled UEs, which is provided from the base station, each UE performs detection algorithm that uses a power difference between the desired signal and the interference signals.

Figure 4:
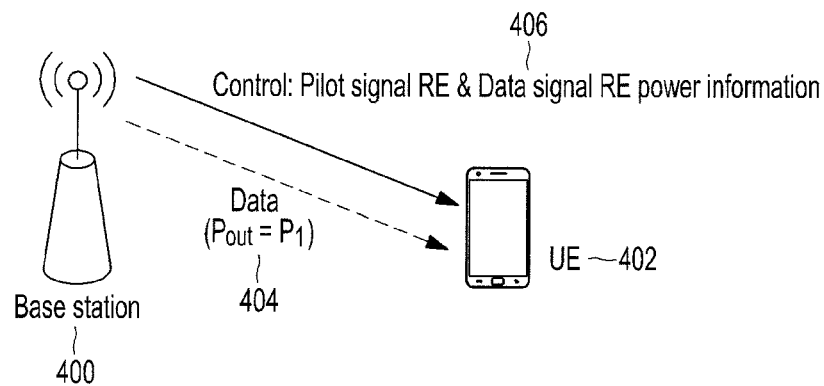
FIG. 4 shows a signal flow for providing power information in a 3rd Generation Partnership Project Long-Term Evolution (3GPP LTE) communication system according to an exemplary embodiment of the present invention.

FIG. 4 shows a signal flow for providing power information in a 3GPP LTE communication system according to an exemplary embodiment of the present invention.

Referring to FIG. 4, a base station 400 transmits a data signal 404 to a UE 402 with a predetermined transmit power $P_1$. During or before the transmission of the data signal 404, the base station 400 transmits information about a power ratio of a data signal to a pilot signal, to the UE 402 using a control signal 406. Since the base station 400 allocates only one UE 402 to one RE, the total transmit power $P_{out}$ of the base station 400 is the same as $P_1$ at the time the RE is allocated. Based on the power ratio, the UE 402 may exactly detect the data signal 404 from the received signal.

Figure 5:
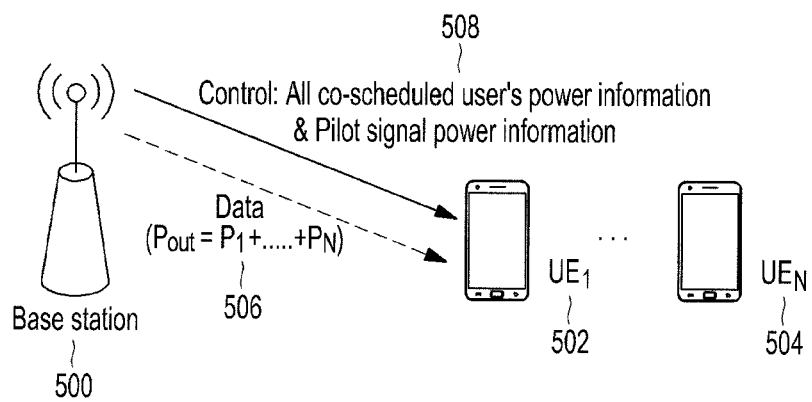
FIG. 5 shows a signal flow for providing power information for co-scheduled UEs in a superposition multiple access system according to an exemplary embodiment of the present invention.

FIG. 5 shows a signal flow for providing power information for co-scheduled UEs in a superposition multiple access system according to an exemplary embodiment of the present invention.

Referring to FIG. 5, a base station 500 simultaneously schedules a plurality of UEs (i.e., $UE_1, \ldots, UE_N$ 502 to 504), which are selected depending on the predetermined criteria, to a single RE, and allocates transmit powers $P_1, \ldots, P_N$ of different values to the UEs 502 to 504. The base station 500 allocates the transmit powers $P_1, \ldots, P_N$ of different values to the UEs 502 to 504, respectively, taking into account a variety of parameters such as pathlosses, Channel Quality Information (CQIs), channel states, transmission modes, Multiple Input Multiple Output (MIMO) modes, and distances from the base station 500, of UEs 502 to 504. As an example, in order to allow each of the UEs 502 to 504 to more easily detect its data, the transmit powers $P_1, \ldots, P_N$ may be allocated such that a difference between them is as large as possible within the total transmit power $P_{out}$ of the base station 500.

While or before simultaneously transmitting data signals for the co-scheduled UEs 502 to 504 using the RE, the base station 500 provides power information for the pilot signal and data signals for all the co-scheduled UEs, to the UEs 502 to 504 using a control signal 508. As an example, the power information indicates power values for the pilot signal and data signals, or indicates power ratios or power offsets of the data signals with respect to a predetermined reference. The predetermined reference may be pilot signal power, or power for any one data signal.

By performing an interference cancellation or joint detection algorithm based on a power ratio (e.g., power difference or power offset) between the pilot signal and the data signals, each of the UEs 502 to 504 may detect its desired signal (e.g., a data signal allocated to the UE itself) from the received signal provided from the base station 500. In other words, in order to better detect its desired signal, a UE may need information not only about the pilot signal power and its data signal power, but also about the data signal power for the other co-scheduled UEs.

Figure 6:
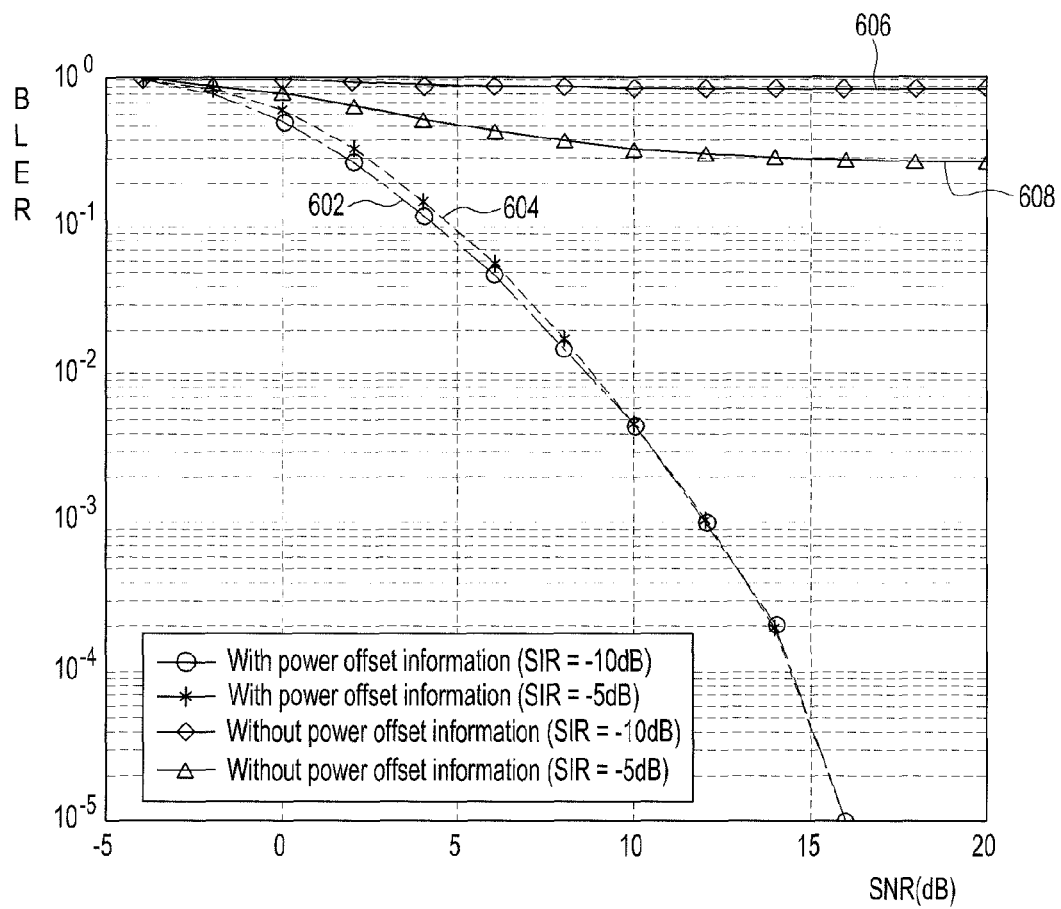
FIG. 6 is a graph showing detection performance for co-scheduled UEs according to an exemplary embodiment of the present invention.

FIG. 6 is a graph showing detection performance for co-scheduled UEs according to an exemplary embodiment of the present invention.

Referring to FIG. 6, curves 602 and 604 indicate Block Error Rates (BLERs) for which Signal to Interference Ratios (SIRs), meaning a power ratio of a desired signal to signals (interference signals) for other UEs, are −10 db and −5 dB, respectively, when a receiving UE has no power offset information for the other co-scheduled UEs. Curves 606 and 608 indicate BLERs, for which SIRs are −10 db and −5 dB, respectively, when a receiving UE has power offset information for the other co-scheduled UEs. The SIR being −10 db and −5 dB means that the interference signal is higher in power than the desired signal by −10 db and −5 dB, respectively.

As illustrated, it can be noted that BLER performance is superior when a receiving UE has power offset information for the other UEs (i.e., curves 606 and 608).

Equation (1) shows received signals in an RE to which a UE1 and a UE2 are co-scheduled.

$$y_{pilot} = H_1 X_{pilot} + n \qquad \rightarrow \tilde{H} \approx H_1 \qquad (1)$$
$$y_{data} = H_1(\alpha_1 X_{data,1}) + H_1(\alpha_2 X_{data,2}) + n$$
$$= (\alpha_1 H_1) X_{data,1} + (\alpha_2 H_1) X_{data,2} + n$$

In Equation (1), $y_{pilot}$ denotes a received pilot signal (or pilot received signal), $H_1$ denotes a channel value for a pilot signal, $X_{pilot}$ denotes a transmitted pilot signal, and n denotes noise. In addition, $y_{data}$ data denotes a received data signal (or data received signal), $\alpha_1$ denotes transmit power allocated to a UE1, $X_{data,1}$ denotes a data signal transmitted for the UE1, $\alpha_2$ denotes transmit power allocated to a UE2, and $X_{data,2}$ denotes a data signal transmitted for the UE2.

As shown, $X_{data,1}$ is received at two UEs over a channel of $H_1$ after $\alpha_1$ is applied thereto, and similarly, $X_{data,2}$ is received at two UEs over the channel of $H_1$ after $\alpha_2$ is applied thereto. In other words, signals for two co-scheduled UEs are transferred to the UEs over the same channel.

If it has no information about a power ratio between $\alpha_1$ and $\alpha_2$, each UE may not detect its desired signal because it can hardly apply an exact estimated channel to the two data signals during joint detection.

Equation (2) shows a process of detecting a desired signal from a received signal.

$$z = (\tilde{H})^{-1}(\alpha_1 H_1) X_{data,1} + (\tilde{H})^{-1}(\alpha_2 H_1) X_{data,2} + \tilde{n} \qquad (2)$$
$$= \alpha_1 X_{data,1} + \alpha_2 X_{data,2} + \tilde{n}$$

In Equation (2), $\tilde{H}$ denotes a channel estimated from a pilot received signal, and may be considered the same as $H_1$. Therefore, a UE may remove terms of $H_1$ by multiplying the received signals shown in Equation (1) by an inverse of the estimated channel, but may not detect $X_{data,1}$ and $X_{data,2}$ if it does not know transmit power values $\alpha_1$ and $\alpha_2$ of the data signals.

Equation (3) shows a process of detecting a desired signal based on power ratio information for co-scheduled UEs.

$$z = (\alpha_1 \tilde{H})^{-1}(\alpha_1 H_1) X_{data,1} + (\alpha_2 \tilde{H})^{-1}(\alpha_2 H_1) X_{data,2} + \tilde{n} \qquad (3)$$
$$= X_{data,1} + X_{data,2} + \tilde{n}$$

As shown, a UE may remove terms of $H_1$, $\alpha_1$ and $\alpha_2$ by multiplying the received signals shown in Equation (1) by an inverse of a product of the estimated channel and a transmit power value for each UE. As an example, a UE may know in advance that any one data signal is transmitted with a higher transmit power, and may first detect the data signal with high transmit power, ignoring the data signal with lower transmit power, and detect the remaining data signals based on the detected data signal. A detailed algorithm for detecting data signals from a received signal is out of the scope of the invention, so a detailed description thereof will be omitted.

Examples of a format of power information for co-scheduled UEs, which is provided from a base station, will be described below.

As an example, power information includes transmit power (or pilot signal power) for a pilot signal, and transmit power (or data signal power) for data signals for all or some of co-scheduled UEs.

Power Information={pilot power,data power1,data power2, . . . ,data powerN} where N denotes the number of some UEs for which power information will be transmitted, among the co-scheduled UEs.

As another example, power information includes pilot signal power and a ratio of data signal powers for co-scheduled UEs to the pilot signal power.

Power Information={pilot power,$\rho_1,\rho_2, \ldots ,\rho_N$} where $\rho_1$ denotes a ratio of data signal power for an i-th UE to pilot signal power.

As another example, power information includes pilot signal power, data signal power for one UE, and a ratio of data signal powers for the other co-scheduled UEs to the data signal power.

Power Information={pilot power,data power1, $\eta_2, \ldots ,\eta_N$} where $\eta_i$ denotes a ratio of data signal power for an i-th UE to data signal power for a UE1 (where i≠1). The UE1 may mean a UE that receives power information, among the N co-scheduled UEs.

As another example, power information includes pilot signal power, a ratio of data signal power for a UE1 to the pilot signal power, and a ratio of data signal powers for the other UEs to the data signal power for the UE1. The UE1 means a UE that receives power information.

Power Information={pilot signal power,$\rho_1,\eta_2, \ldots \eta_N$}

Where $\rho_1$ and $\eta_i$ are the same as above.

The transmit power value(s) or the power ratio in the power information may be quantized into a predetermined number of bits for each UE. For example, if two UEs are co-scheduled, and data signal power for each UE may have a value of 0 dB~−12 dB with respect to the pilot signal power in units of 3 dB, a power ratio may be indicated by a group index indicating a quantized level of the power ratio as shown in FIG. 7.

FIG. 7 is a graph showing group indexes indicating quantized levels of power ratio for co-scheduled UEs according to an exemplary embodiment of the present invention.

Referring to FIG. 7, when a range of a ratio x of a data signal power to pilot signal power is 0 dB≤x≤−3 dB, power information includes a group index 0 of '00'. When a range of a ratio x of a data signal power to pilot signal power is −3 dB<x≤−6 dB, power information includes a group index 1 of '01'. When a range of a ratio x of a data signal power to pilot signal power is −6 dB<x<=−9 dB, power information includes a group index 2 of '10'. When a range of a ratio x of a data signal power to pilot signal power is −9 dB<x≤−12 dB, power information includes a group index 3 of '11'.

Power information for co-scheduled UEs may be transmitted to the UEs over a semi-static or dynamic control channel. The semi-static control channel means a channel that is transmitted on a one-time basis or at relatively long periods (or intervals) to carry control information that does not vary frequently, whereas the dynamic control channel means a channel that is transmitted at relatively short periods (or intervals) to carry control information that varies frequently.

As an example, in the superposition multiple access system, co-scheduled UEs may dynamically vary, so modulation information for the co-scheduled UEs is transferred over a dynamic control channel to help handle interference of UEs. Control information carried on the dynamic control channel may further include power information for co-scheduled UEs. On the other hand, information about pilot signal power and data signal power for the UE itself that receives power information may be transmitted over a semi-static control channel.

An example will be described in which a superposition multiple access system is applied to an LTE system. The LTE system transmits Downlink Control Information (DCI) to a UE over a Physical Downlink Control Channel (PDCCH) which is a dynamic control channel. The DCI may include information for signal detection by the co-scheduled UEs to assist in a function of handling interference of UEs.

As an example, any one of the existing DCI formats may be extended to further include information for signal detection by the co-scheduled UEs. As another example, a new DCI format may be configured to include information for signal detection by the co-scheduled UEs.

Table 1 below shows an example of a DCI format including information for co-scheduled UEs according to an exemplary embodiment of the present invention. Although a plurality of parameters included in the DCI format are shown below, it will be apparent to those of ordinary skill in the art that one or more of the following parameters may be included in the DCI format depending on the system implementation, the communication standards, and the selection of the operator/manufacturer.

TABLE 1

| Parameter | | Bits |
| --- | --- | --- |
| Transport block to codeword swap flag | Indicates whether a swapped channel is applied, when two transports are transmitted by spatial multiplexing. | 1 |
| HARQ process number | HARQ process number for a transport block transmitted in a pertinent subframe | 3 |
| Transport block 1 | Modulation and coding scheme | 5 |
| | New data indicator | 1 |
| | Redundancy version (packet start position information transmitted in an encoded packet) | 2 |
| Transport block 2 | Modulation and coding scheme | 5 |
| | New data indicator | 1 |
| | Redundancy version | 2 |
| Pre-coding information | Inform pre-coding matrix index during pre-coding | 3 |
| UE ID | Interference UE ID | 16 |
| Transmission mode | Interference transmission mode | 2 |
| CFI | Interference control formation indicator | 2 |
| Power ratio 0 | CRS to interference data power in CRS symbols | 2 |
| Power ratio 1 | CRS to interference data power in non-CRS symbols | 2 |
| Total | | 56 |

The DCI format in Table 1 includes information parameters for any one of the co-scheduled UEs. Therefore, the DCI format may be configured and transmitted for each co-scheduled UE. It should be noted that information parameters for the UE itself that receives the DCI format, especially the information about pilot signal power and data signal power may be transmitted using a separate DCI format, e.g., a DCI format of a semi-static control channel. In other words, the DCI format in Table 1 represents information parameters for each of the other UEs except for the UE that receives the DCI format, among the co-scheduled UEs.

Referring to Table 1, information for signal detection of a co-scheduled UE includes a 'Transport block to codeword swap flag' parameter indicating whether a swap between transport channels is applied, when two Spatial Multiplexing (SM)-multiplexed transport channels are transmitted to the UE, a 'Hybrid Automatic Retransmission Request (HARQ) process number' parameter for a transport block that is transmitted in a pertinent subframe, a 'Modulation and Coding Scheme (MCS) (or transmission format information)' parameter for each transport block, a 'New Data Indicator' parameter for HARQ, a 'Redundancy Version (RV)' parameter indicating a start position of a packet that is transmitted in an encoded packet, a 'pre-coding information' parameter indicating a Pre-Coding Matrix Index (PMI), a 'UE ID' parameter indicating an identifier of the UE, a 'Transmission mode' parameter indicating a Space-Frequency Block Coding (SFBC) scheme, Spatial Multiplexing (SM) scheme, a MIMO scheme, etc., and a 'Control Formation Indicator (CFI)' parameter indicating information about the size of a control region, and further includes especially at least one 'power ratio' parameter indicating a ratio of data signal power to pilot signal power. In this example, the 'power ratio' parameter includes a 'Power ratio 0' parameter indicating a power ratio in an OFDM symbol with a CRS (i.e., a CRS symbol), and a 'Power ratio 1' parameter indicating a power ratio in an OFDM symbol without a CRS (i.e., a non-CRS symbol). For each power ratio parameter, the number of its bits is determined depending on a quantization level of the power ratio, and in this example, the power ratio parameter is comprised of two bits based on the exemplary embodiment shown in FIG. 7.

Figure 8:
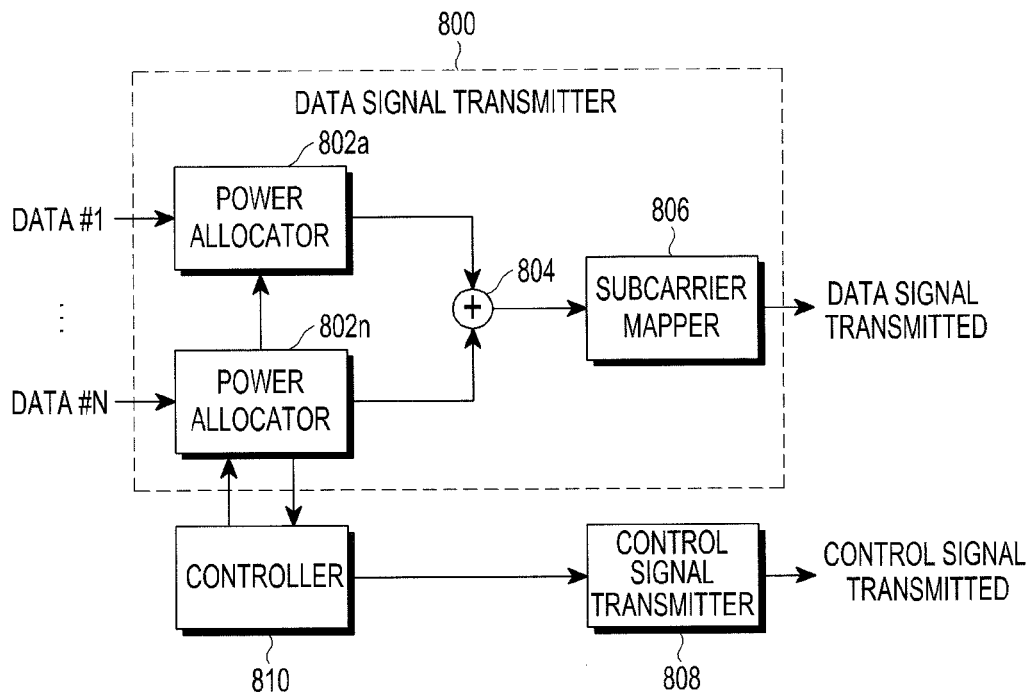
FIG. 8 shows a structure of a base station according to an exemplary embodiment of the present invention.

FIG. 8 shows a structure of a base station according to an exemplary embodiment of the present invention.

Referring to FIG. 8, a controller 810 controls a data signal transmitter 800 by co-scheduling at least some of the USs desiring superposition multiple access communication, to at least one same RE (e.g., a subcarrier), and generates control information based thereon. The controller 810 may select at least some UEs it will co-schedule, taking into account at least one of a pathloss of each UE, a Reference Signal Received Power (RSRP) or Received Signal Code Power (RSCP) measurement value reported by each UE, a measurement value for an uplink Sounding Reference Signal (SRS) transmitted by each UE, CQI, a channel state, a transmission mode, a MIMO mode, and each UE's distance from the base station.

If a signal measurement value used for co-schedule has a large error, the co-schedule may not be performed correctly, and thus, a signal power difference between the co-scheduled UEs is not large enough, causing a reduction in gain of the superposition multiple access. Therefore, in order to compensate for a measurement accuracy error, the controller 810 may use a variety of technologies, such as, for example, a signal filtering scheme for improvement of measurement accuracy, a scheme of applying a margin to a pathloss difference between UEs for co-schedule, and a scheme of applying measurement requirements for superposition multiple access UEs.

In the example shown, the data signal transmitter 800 includes N power allocators 802a to 802n for N co-scheduled UEs, a summer 804, and a subcarrier mapper 806. If N UEs, which are co-scheduled to a specific RE, are determined, the controller 810 controls an input path for data signals so that N data signals for the co-scheduled UEs may be input to the N power allocators 802a to 802n. The N power allocators 802a to 802n multiply their input data signals by transmit powers $P_1, \ldots, P_N$ provided from the controller 810. The transmit power for each co-scheduled UE may be determined, taking into account a variety of parameters, such as, for example, pathlosses of co-scheduled UEs, CQIs, MCSs, Rank Indicators (RIs) indicating the number of transmission streams during multi-stream transmission, received signal powers, Signal to Noise Ratios (SNRs), and UE's distances from the UE. The received signal powers may be, for example, RSRP, Reference Signal Received Quality (RSRQ), and Received Signal Strength Indicator (RSSI).

As an example, in order for each UE to more easily detect data, the controller 810 may allocate transmit powers $P_1, \ldots, P_N$ such that the co-scheduled UEs may have a power ratio difference as large as possible within the total transmit power Pout of the base station. The information about the allocated transmit powers is provided to the power allocators 802a to 802n.

The summer 804 sums the signals output from the power allocators 802a to 802n on an RE basis, and transfers the results to the subcarrier mapper 806. The subcarrier mapper 806 maps the signal from the summer 804 to the common RE for the co-scheduled UEs before its transmission.

The controller 810 generates power information for each of the co-scheduled UEs. Each of the power information includes information about pilot signal power and data signal power for a UE that receives the power information, and information about data signal powers for the other co-scheduled UEs (i.e., interference UEs). As an example, power information for a UE1 includes information (i.e., transmit power value or power ratio) about pilot signal power and data signal power for the UE1, and information (i.e., transmit power value or power ratio) about data signal powers for second to N-th UEs (UE2 to UE_N). The term 'power ratio' as used herein may refer to a ratio of its signal power to pilot signal power, or a ratio of its signal power to data signal power for a UE1.

The power information is transmitted to the co-scheduled UEs by a control signal transmitter 808 using a signal on a control channel. As described above, the information about pilot signal power and data signal power for the UE1, and the information about data signal powers for the second to N-th UEs may be transmitted over different control channels. For example, the control signal transmitter 808 may transmit the information about pilot signal power and data signal power for the UE1 over a semi-static control channel, and transmit the information about data signal powers for the second to N-th UEs over a dynamic control channel.

Figure 9:
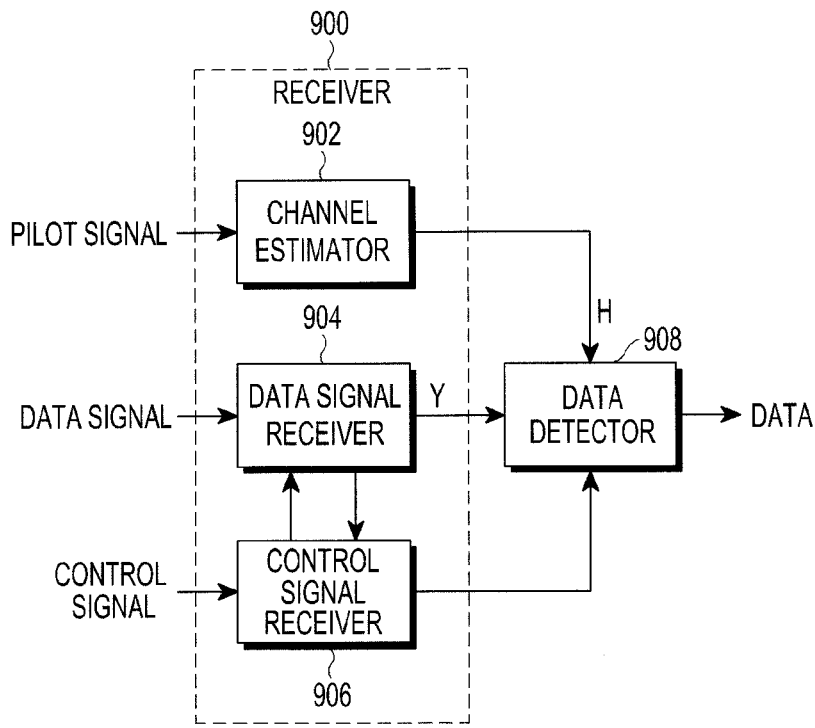
FIG. 9 shows a structure of a UE according to an exemplary embodiment of the present invention.

FIG. 9 shows a structure of a UE according to an exemplary embodiment of the present invention, in which the UE may be any one of UEs co-scheduled by a base station.

Referring to FIG. 9, a receiver 900 may include a channel estimator 902 corresponding to a pilot channel, a data signal receiver 904 corresponding to a data channel, and a control signal receiver 906 corresponding to a control channel. The channel estimator 902 performs channel estimation by receiving a pilot signal. Specifically, the channel estimator 902 determines a channel estimation value by receiving a pilot signal that is extracted from the received signal from the base station at a predetermined resource position. The channel estimation value is transferred to a data detector 908 so that it may be equally applied to all UEs which are co-scheduled to a specific RE.

The data signal receiver 904 extracts a received signal including data signals for the co-scheduled UEs, from the RE to which the co-scheduled UEs are allocated, and transfers the extracted received signal to the data detector 908. The control signal receiver 906 receives a control signal extracted from the resource position where a control channel is allocated, extracts power information for the co-scheduled UEs, and transfers the power information to the data detector 908. The power information includes information about pilot signal power and data signal power for a UE, and information about data signal power for the other co-scheduled UEs (i.e., interference UEs). As described above, the information about pilot signal power and data signal power for a UE1, and the information about data signal powers for the second to N-th UEs may be received over different control channels. As an example, the control signal receiver 906 receives the information about pilot signal power and data signal power for a UE over a semi-static control channel, and receives the information about data signal powers for interference UEs over a dynamic control channel.

The data detector 908 detects a data signal for a UE from a received signal output from the data signal receiver 904, based on the channel estimation value provided from the channel estimator 902 and the power information provided from the control signal receiver 906. Specifically, the data detector 908 may detect a desired data signal by performing an interference cancellation or joint detection algorithm based on its input information. A detailed algorithm for detecting data signals from a received signal is out of the scope of the invention, so a detailed description thereof will be omitted.

As is apparent from the foregoing description, exemplary embodiments of the present invention may improve detection performance of a UE in the superposition multiple access system, thus contributing to an increase in scheduling flexibility and system throughput of a base station.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for signaling power information in a wireless communication system, the method comprising:
   co-scheduling a plurality of User Equipments (UEs) to at least one resource element;
   generating power information indicating transmit power values which are allocated for the co-scheduled UEs; and
   transmitting the generated power information to a first UE of the co-scheduled UEs,
   wherein the power information comprises first power information for the first UE and second power information for at least one second UE except for the first UE among the co-scheduled UEs.

2. The method of claim 1, wherein the first power information indicates a pilot signal power value and a transmit power value for the first UE among the co-scheduled UEs, and the second power information indicates at least one transmit power value for at least one second UE except for the first UE among the co-scheduled UEs.

3. The method of claim 2, wherein the first power information is transmitted over a semi-static control channel and the second power information is transmitted over a dynamic control channel.

4. The method of claim 2, wherein the first power information includes information indicating a ratio of a transmit power value for the first UE to the pilot signal power value.

5. The method of claim 1, wherein the second power information includes information indicating a ratio of a transmit power value for the second UE to the pilot signal power value.

6. The method of claim 1, wherein the second power information includes information indicating a ratio of a transmit power value for the second UE to a transmit power value for the first UE.

7. A method for receiving power information by a first User Equipment (UE) in a wireless communication system, the method comprising:

receiving, by the first UE, power information indicating transmit power values allocated for a plurality of User Equipments (UEs) which are co-scheduled to at least one resource element;

receiving, by the first UE, a wireless signal including data signals for the co-scheduled UEs, using the at least one resource element; and detecting, by the first UE, a desired data signal from the wireless signal based on the power information, wherein the power information comprises first power information for the first UE and second power information for at least one second UE except for the first UE among the co-scheduled UEs.

8. The method of claim 7, wherein the first power information indicates a pilot signal power value and a transmit power value for the first UE among the co-scheduled UEs, and the second power information indicates at least one transmit power value for at least one second UE except for the first UE among the co-scheduled UEs respectively.

9. The method of claim 7, wherein the first power information is received over a semi-static control channel and the second power information is received over a dynamic control channel.

10. The method of claim 7, wherein the first power information includes information indicating a ratio of a transmit power value for the first UE to the pilot signal power value.

11. The method of claim 7, wherein the second power information includes information indicating a ratio of a transmit power value for the second UE to the pilot signal power value.

12. The method of claim 7, wherein the second power information includes information indicating a ratio of a transmit power value for the second UE to a transmit power value for the first UE.

13. A base station apparatus for signaling power information in a wireless communication system, the base station apparatus comprising:

a controller for co-scheduling a plurality of User Equipments (UEs) to at least one resource element; and a transmitter for transmitting power information indicating transmit power values allocated for the co-scheduled UEs, to a first UE of the co-scheduled UEs, wherein the power information comprises first power information related to a transmit power value for the first UE and second power information related to at least one transmit power value for at least one second UE except for the first UE among the co-scheduled UEs, wherein the power information comprises the first power information for the first UE and the second power information for at least one second UE except for the first UE among the co-scheduled UE.

14. The base station apparatus of claim 13, wherein the first power information indicates a pilot signal power value and a transmit power value for the first UE among the co-scheduled UEs, and the second power information indicates at least one transmit power value of the at least one second UE except for the first UE among the co-scheduled UEs.

15. The base station apparatus of claim 14, wherein the first power information is transmitted over a semi-static control channel and the second power information is transmitted over a dynamic control channel.

16. The base station apparatus of claim 14, wherein the first power information includes information indicating a ratio of a transmit power value for the first UE to the pilot signal power value.

17. The base station apparatus of claim 14, wherein the second power information includes information indicating a ratio of a transmit power value for the second UE to the pilot signal power value.

18. The base station apparatus of claim 14, wherein the second power information includes information indicating a ratio of a transmit power value for the second UE to a transmit power value for the first UE.

19. A User Equipment (UE) apparatus for receiving power information in a wireless communication system, the UE apparatus comprising:

a first receiver for receiving power information indicating transmit power values allocated for a plurality of UEs which are co-scheduled to at least one resource element;

a second receiver for receiving a wireless signal including data signals for the co-scheduled UEs, using the at least one resource element; and a data detector for detecting a data signal for a first UE among the plurality of co-scheduled UEs, from the wireless signal based on the power information, wherein the power information comprises first power information related to a transmit power value for the first UE including the UE apparatus and second power information related to at least one transmit power value for at least one second UE except for the first UE among the co-scheduled UEs, wherein the power information comprises the first power information for the first UE and the second power information for at least one second UE except for the first UE among the co-scheduled UEs.

20. The UE apparatus of claim 19, wherein the first power information indicates a pilot signal power value and a transmit power value for the first UE among the co-scheduled UEs, and the second power information indicates at least one transmit power value for the at least one second UE except for the first UE among the co-scheduled UEs respectively.

21. The UE apparatus of claim 19, wherein the first power information is received over a semi-static control channel and the second power information is received over a dynamic control channel.

22. The UE apparatus of claim 19, wherein the first power information includes information indicating a ratio of a transmit power value for the first UE to the pilot signal power value.

23. The UE apparatus of claim 19, wherein the second power information includes information indicating a ratio of a transmit power value for the second UE to the pilot signal power value.

24. The UE apparatus of claim 19, wherein the second power information includes information indicating a ratio of a transmit power value for the second UE to a transmit power value for the first UE.

* * * * *